US012288399B2

(12) United States Patent
Sandoval et al.

(10) Patent No.: US 12,288,399 B2
(45) Date of Patent: Apr. 29, 2025

(54) SECURE EDGE PLATFORM USING IMAGE CLASSIFICATION MACHINE LEARNING MODELS

(71) Applicant: Sandoval Custom Creations, Inc, Larkspur, CO (US)

(72) Inventors: Shaun Sandoval, Milton, FL (US); Chad Carpenter, Montrose, SD (US); Joshua Smolenak, Racho Mission Viejo, CA (US); James Straatmeyer, Hartford, SD (US); Tony Schoborg, Parker, SD (US)

(73) Assignee: Sandoval Custom Creations, Inc., Larkspur, CO (US)

( * ) Notice: Subject to any disclaimer, the term of this patent is extended or adjusted under 35 U.S.C. 154(b) by 451 days.

(21) Appl. No.: 17/933,529

(22) Filed: Sep. 20, 2022

(65) Prior Publication Data
US 2023/0093698 A1 Mar. 23, 2023

Related U.S. Application Data

(60) Provisional application No. 63/246,687, filed on Sep. 21, 2021.

(51) Int. Cl.
*G06V 20/52* (2022.01)
*G06F 21/62* (2013.01)
(Continued)

(52) U.S. Cl.
CPC .......... *G06V 20/52* (2022.01); *G06F 21/6245* (2013.01); *G06V 10/764* (2022.01);
(Continued)

(58) Field of Classification Search
None
See application file for complete search history.

(56) References Cited

U.S. PATENT DOCUMENTS

2019/0251369 A1\* 8/2019 Popov ................... G06V 20/54
2020/0057885 A1 2/2020 Rao et al.
(Continued)

FOREIGN PATENT DOCUMENTS

WO WO 2020/182320 9/2020
WO WO-2020182320 A1 \* 9/2020 ............ G06F 11/302

OTHER PUBLICATIONS

International Search Report and Written Opinion in International Appln. No. PCT/US2022/076725, mailed on Dec. 21, 2022, 14 pages.

*Primary Examiner* — Delomia L Gilliard
(74) *Attorney, Agent, or Firm* — Fish & Richardson P.C.

(57) ABSTRACT

Methods, systems, and apparatus, including medium-encoded computer program products, for a secure edge platform that uses image classification machine learning models. An edge platform can include at least one camera and can identify image classification models that generate classification output data from image data generated by the cameras. The edge platform can receive image data generated by the camera, and provide the image data to the models. In response to providing the image data classification models, the edge platform can receive classification output data. In response to receiving the classification output data from the image classification models, the edge platform can generate augmentation data that is associated with the image data, then transmit detection data to a central server platform. The detection data can include (i) the classification output data and (ii) the augmentation data associated with the image data. Data can be made recordable, reportable, searchable, and alarmable.

20 Claims, 5 Drawing Sheets

(51) Int. Cl.
  *G06V 10/70* (2022.01)
  *G06V 10/764* (2022.01)
  *G06V 20/62* (2022.01)
  *G06V 40/16* (2022.01)

(52) U.S. Cl.
  CPC ............ *G06V 10/87* (2022.01); *G06V 20/625* (2022.01); *G06V 40/172* (2022.01)

(56) References Cited

U.S. PATENT DOCUMENTS

2020/0160087 A1* 5/2020 Redmon ................ G06V 10/82
2022/0004823 A1* 1/2022 Shoshan .............. G06V 10/778

* cited by examiner

SECURE EDGE PLATFORM USING IMAGE CLASSIFICATION MACHINE LEARNING MODELS

CROSS-REFERENCE TO RELATED APPLICATION

This application claims the benefit of U.S. Provisional Pat. App. No. 63/246,687, filed Sep. 21, 2021, which is incorporated by reference.

FIELD

This specification relates to edge computing, and one example implementation relates to edge computing devices that selectively process sensor data using machine learning-trained models.

BACKGROUND

Generally speaking, edge computing is a distributed computing methodology in which computation and data storage occur close to the sources of data rather than in a remote data center. One example of an edge computing device is an automated ticket reader for a mass transit system, which can rapidly make a decision to allow or deny a rider's access to a vehicle without requiring the input of a different, network-connected device.

SUMMARY

This specification describes technologies relating to a secure edge platform that efficiently use limited computing, storage and networking resources on the edge platform to enable accurate identification of subjects or objects of interest without compromising the privacy of the general public. Sensor data captured by the secure edge platform is analyzed using a selectable subset of activatable image classification machine learning models to determine whether a subject or object of interest is potentially present in the environment. By using a subset of available models (e.g., all or fewer than all of the models), computational resources on the secure edge platform are conserved. Once the secure edge platform identifies a candidate subject of interest, the platform augments, normalizes and securely transmits the data without comprising the resolution of the sensed data, enabling a central server platform to accurately perform additional analysis.

Particular embodiments of the subject matter described in this specification can be implemented so as to realize one or more of the following advantages. The techniques described below can be used to reduce resource demands by creating a software platform that incorporates unique code, edge computing, real time and historical computing, and visualization of multiple analytic modes to bring multiple analytics into a single platform to realize data analysis and synthesis, while making the data that is gathered by the analytics recordable, reportable, searchable, and alarmable. In one example, the techniques limit the computing resources required on an edge platform by selecting for execution only a subset of available image data classifications machine learning models. Further, the active subset can be changed over time to tailor operation of the edge platform without exceeding the computational resources available on the edge platform. In addition, the techniques described below reduce necessary bandwidth by only transmitting information that is requested or relevant to an investigation. In addition, the techniques below perform data transformations to supplement unstructured data with structured data to enhance the ability to analyze the data accurately.

One aspect features an edge platform that includes at least one camera identifying one or more particular image classification models from among multiple image classification models that are associated with the edge platform, where each image classification model can be configured to generate classification output data based upon processing image data that is generated by the camera included on the edge platform. The edge platform can receive image data that was generated by the camera included on the edge platform, and provide the particular image data to the particular image classification models. In response to providing the particular image data to the particular image classification models, the edge platform can receive particular classification output data from the particular image classification models. In response to receiving the particular classification output data from the particular image classification models, the edge platform can generate augmentation data that is associated with the particular image data, then transmit detection data to a central server platform. The detection data can include (i) the particular classification output data and (ii) the augmentation data associated with the particular image data.

One or more of the following features can be included. Before generating the augmentation data, the edge platform can store the particular classification output data on a local storage medium that is associated with the edge platform. After transmitting the detection data to the central server platform, the edge platform can receive an indication that the detection data has been received by the central server platform, then delete the particular classification output data from the local storage medium that is associated with the edge platform. After receiving the indication that the detection data has been received by the central server platform, the edge platform can provide to one or more particular image classification models, an instruction to delete the particular image data and the particular classification output data. At least one camera can be a high-definition video camera. The detection data can include at least a subset of the particular image data. The edge platform can receive an indication to activate a second image classification model from among multiple image classification models that is not among the one or more particular image classification models, and active the second image classification model. The edge platform can determine that a second image classification model from among multiple image classification models that is not one or more particular image classification models should be activated and activate the second image classification model. The particular classification output data from the one or more particular image classification models can indicate one or more of detecting a face, detecting a license plate number or detecting a tail number. In response to the central server platform receiving the detection data, the central server system can determine that the detection data satisfies a matching condition, and provide a notification to a responding party. The detection data can include a detected face, and determining that the detection data satisfies a matching condition can include matching the detected face against a reference face. The detection data can include a detected license plate number, and determining that the detection data satisfies a matching condition can include matching the detected license plate number against a reference license plate number. The detection data can include a detected tail number, and determining that the detection data satisfies a matching condition can include matching the detected tail number against a reference tail number. The responding party can be one or more law enforcement agents. The details of one or more embodiments of the subject matter described in this specification are set forth in the accompanying drawings and the description below. Other features, aspects, and advantages of the invention will become apparent from the description, the drawings, and the claims.

DETAILED DESCRIPTION

Figure 1A:
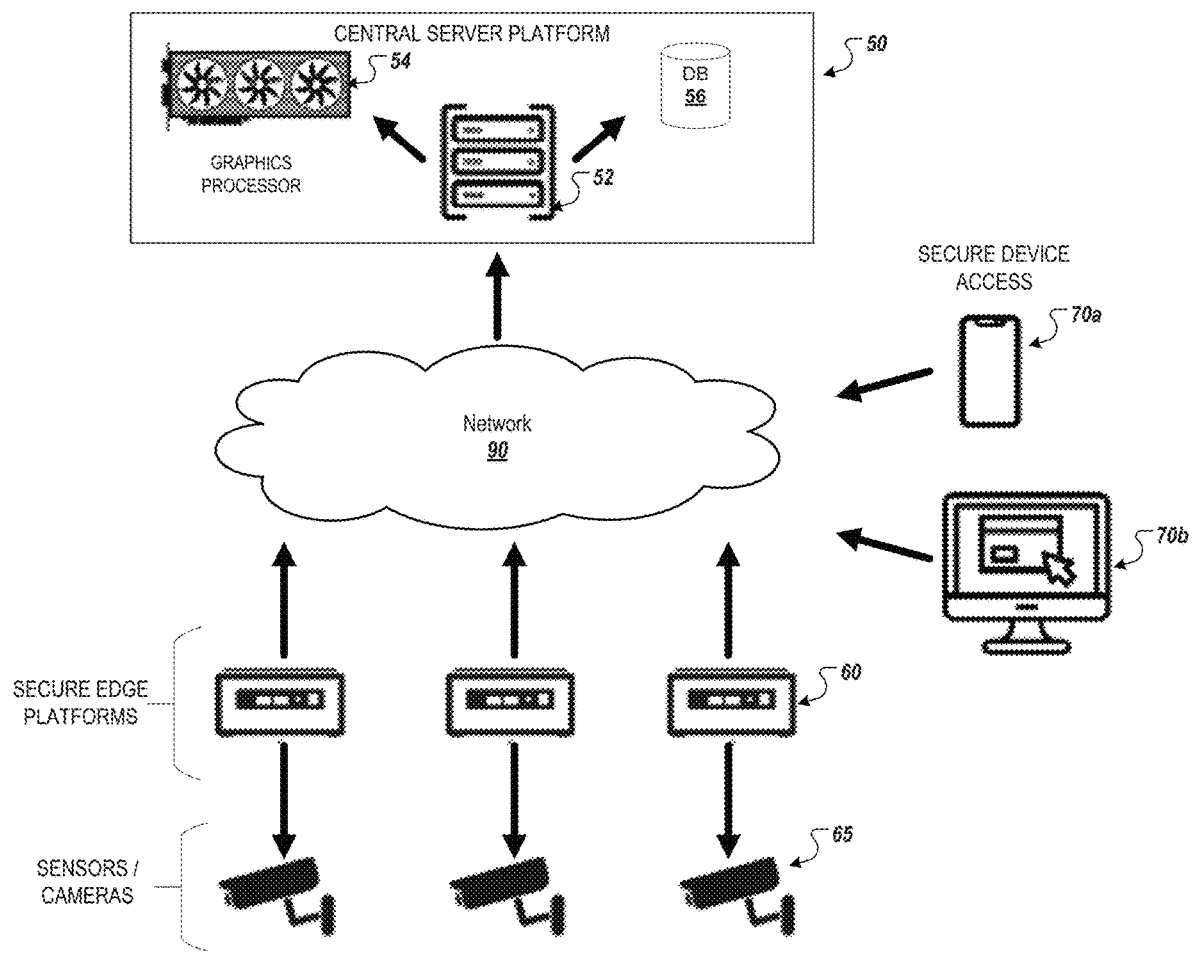
FIG. 1A illustrates an example environment for a central server platform and a secure edge platform.

FIG. 1A illustrates an example environment for a central server platform 50 and a secure edge platform 60. The central server platform 50, which can be referred to as RAPTOR in this specification, can include video analytics, and the secure edge platforms 60 can include data-gathering capabilities, as described further below. The analytics can include a variety of detection and recognition algorithms, allowing administrators to make decisions based on real-time event-based data. RAPTOR can provide the information gathered from the analytics, and provide it as recordable, reportable, searchable and alarmable, including live views, video playback and export.

The central server platform can 50 receive sensor data from sensors 65 and enable operators and administrators to observe real-time, event-based data from the sensors 65 on a consolidated console, promoting fast decision making based on system event data output. Data sent from the secure edge platform 60 to the central server 50 can be presented visually within a Web portal included in RAPTOR. The portal can display detection data, including thumbnail images, full resolution context images and short video clips, among other formats, at full resolution of the event. Metadata such as vehicle make and model, license plate, airplane tail number or boat registration information can also be included in the portal view. The portal can further enable users to provide and store case note related to the detection data.

By processing analytics at the secure edge platform 60, which can include, or be coupled to, sensors 65 such as cameras, the system can employ minimal compression, providing higher resolution, and therefore more pixels from which to detect objects accurately, including license plates, airplane tail numbers, faces, pedestrians, vehicles, airplanes, weapons and crowd behavioral anomalies, among other examples. The secure edge platform 60 can include multiple analytics models, providing powerful and flexible detection capabilities, as described future below.

The edge platform 60 can communicate with the central server platform 50 over a secure network 90. For example, communication between the edge platform 60 and the central server platform 50 can use Secure Socket Layer (SSL) and Transport Layer Security (TLS) to ensure secure communication. In addition, in some implementations, communication can only occur when the secure edge platform 60 has been authorized by the central server platform 50.

The central server platform 50 can be configured as a multi-tenant platform, allowing administrators to set up groups of users that are assigned to monitor a subset of camera sensors 65, allowing analysts to use the platform to assist in investigations based on data detected and displayed in RAPTOR Web user interface. For example, data can be provided to user devices such as a mobile device 70a or a personal computer 70b, among other user devices.

Administrators can configure a level of access provided to other users of the central server platform 50. Access can be defined for a particular users, and can be governed by role-based access control (RBAC), including hierarchical RBAC. Access to a user or to a role can be defined at any level of granularity, including any resource, collection of resources, data item, collection of data items. For example, a user or role can be permitted to access a particular sensor, group of sensors, a type of sensor, all sensors, data from a particular sensor, data from a group of sensors, data from a type of sensors, data from all sensors, data relating to a particular project, among many other examples. A user or role can similarly be configured on other data and resources type, e.g., permitting or denying access to reports and to defining or altering reports.

The central server platform 50 can include one or more processors 52, processor accelerators 54 (e.g., Graphics Processors) and data storage 56. The processors 52 can accept data from the network 90, and process the data to make it recordable, reportable, searchable and alarmable, using processor accelerators 54 as needed. The central server platform 50 can generate reports in response to user requests, can provide reports in response to events (e.g., a detection) and/or on configured schedules. Results of the processing, including reports, can be stored on data storage 56, such as a relational database, an unstructured database, a file system, and other appropriate storage technologies.

Figure 1B:
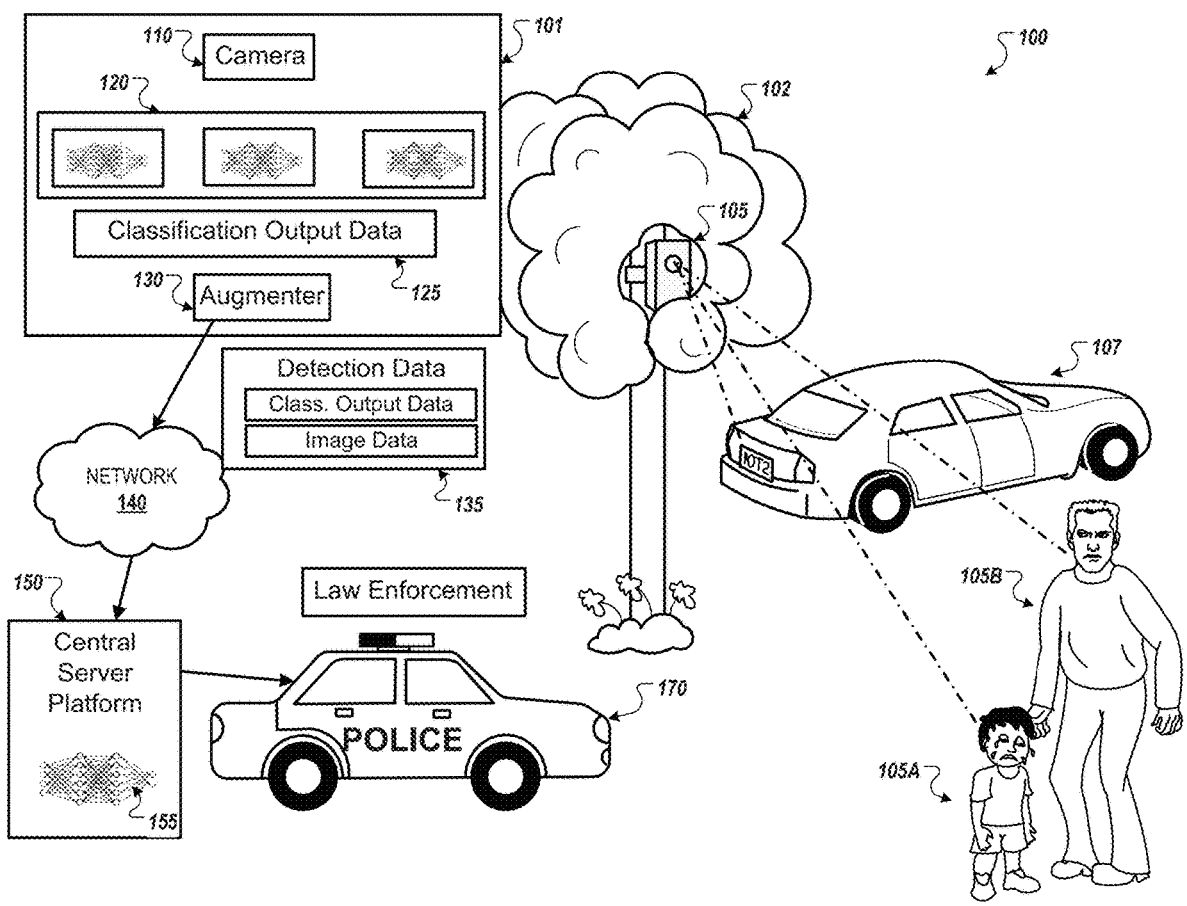
FIG. 1B illustrates an example of a secure edge platform.

FIG. 1B illustrates an example 100 of a secure edge platform 101. In the illustrated example 100, a secure edge platform 101 can be used to capture photographic images and possibly other sensor data, and to use that data to provide law enforcement and other authorized parties with information about the environment around the secure edge platform 101. In example 100, the secure edge platform 101 is a surveillance platform.

The secure edge platform 101 can be included in a rig 105 that is designed to be camouflaged, e.g., in a tree 102 or otherwise made inconspicuous within a surveillance environment. In outline, the edge platform 101 can include one or more cameras 110 or other sensor types, and a set of image classification models 120, or other models configured to process raw sensor data. The camera 110, which can be a high definition (HD) video camera or an HD still-frame camera, can collect images of the environment in the vicinity of the rig 105. The camera 110 can capture images including, in this example, a distressed child 105A, a suspicious party 105B near the distressed child 105A, and the license plate on a vehicle 107.

The secure edge platform 101 can, among other uses, aid law enforcement in the investigation of crimes such as smuggling, illegal drug distribution, child abduction and other types of criminal investigations that can benefit from covert information gathering. As such, the secure edge platform is designed to be camouflaged or otherwise hidden from view so it can capture images furtively. Similarly, lawful investigations performed by parties that are not law enforcement can benefit from stealth.

Using the secure edge platform 101 for such real-time detection of subjects or objects of interest can be essential to enabling immediate intervention when adverse situations arise. For example, detection of a person of interest in a crime such as a child abduction, drug trafficking, suspicion of terrorism, or other major crimes, can allow law enforcement to intervene immediately to thwart the crime. However, numerous technical challenges exist in providing such a platform, including limiting processing capability at the secure edge platform 101, networks that can have low-bandwidth and/or intermittent connectivity, storage capacity constraints and privacy constraints, as described further below.

First, to maintain privacy and security, information about the target may be stored in a secure environment, and potentially not at the edge, e.g., on a field surveillance rig 105. Field surveillance rigs 105 can be misappropriated, which can create to privacy issues. With access to the rig 105, third-parties could determine a target, who is presumed innocent and maintains a general right to privacy that should not be pierced by misuse of the rig 105. In addition, if the subject obtained the rig 105, he could determine that he is being surveilled, and take evasive action. Further, cameras 110 on the rig 105 will capture all parties in the vicinity of the rig 105, so deleting image data unrelated to the subject is important for preserving the privacy of the general public. For at least those privacy-related reasons, it is preferable to transmit image data to a secure location for processing, and to delete image data unrelated to the subject(s) of interest.

However, the transmission of image data creates technical challenges. For example, in many cases, the rig will have limited and/or intermittent connectivity, so transmitting large quantities of data, including high-resolution video, to a central server platform for additional, compute-intensive processing can be impossible. In addition, since recognition models are typically more accurate when higher resolution data are available, downscaling the video to fit within bandwidth constraints is undesirable as it limits the effectiveness of detection models that execute at a central server platform.

In addition, a surveillance system can rely on a wide variety of image analytics 120, such as face detecting, license plate readers, tail number readers, text recognition, image recognition, and so on, but the processing capacity of the rig can be limited. Therefore, it can be technically infeasible to execute all necessary models concurrently on a secure edge platform 101.

Further, once relevant data has been transmitted to a secure location, such as a central server platform, it can be undesirable to retain the raw sensor data on the rig. While the rig can include anti-tampering countermeasures, and can be camouflaged, a motivated party could plausibly access the rig in some unusual circumstances. For the reasons described above, maintaining the data on the rig can impinge on privacy of members of the general public who happen to pass in the vicinity of the rig 105. However, in some implementations, retaining raw sensor data on the rig 105 is necessary, e.g., to provide a chain of custody and historical record. In such cases, raw sensor data can be encrypted and stored on one or more tamper-resistant and/or tamper-evident devices.

To address these technical challenges, this specification describes a system in which image data, which can be voluminous, is initially analyzed using configurable models resident at the edge in the rig, or in close proximity to the rig, and the results of the analysis are transmitted to a central server, limiting the required network bandwidth while still providing full-resolution image data. The rig can further augment the data, adding metadata that can be used to enhance analysis performed at a central server platform, as describe further below. The analysis modules can be activated and deactivated based on received signals or on criteria evaluated at the rig, limiting the computational burden at the rig. In addition, the rig can receive signals that cause the rig to delete sensitive data, enhancing privacy and reducing the storage requirement at the rig.

A central server platform 150, which can include ample compute resources, can optionally perform further processing (enabling the data to be visualized, recorded, reported and searched), pattern recognition, anomaly detection and other advanced analytics. Further, the data can be alarmed, and triggered alarms can cause immediate response by law enforcement 170. Based on analysis performed by the rig 105 and/or the central server 150, models 120 on the rig 105 can be enabled and disabled, conserving valuable computing resources.

Returning to the example 100 illustrated in FIG. 1, image recognition models 120 in the edge platform 101 can process the image data produced by the camera 110 to produce classification output data 125. The classification output data 125 can include indications of detected elements of the image data. The classification output data 125 can include an indication that a license plate, tail number or face was detected, and can further include properties of the detected element. For example, properties of a face can include whether glasses are present, estimated age or race, mood of the subject, among other properties. In this example illustration, the classification output data 125 can include an indication of distress for the child 105A.

An augmenter 130 in the edge platform 101 can augment the image data and classification output data to produce detection data 135. The augmentations can include any static or dynamic data available to the edge platform 101 that is not used or produced by the image recognition models 120. For example, the augmenter 130 create detection data 135 that includes metadata such as Global Positioning Satellite (GPS) coordinates of the rig 105, the orientation of the camera 110, an edge platform identifier (since multiple edge platforms 101 can be surveilling an area simultaneously and multiple areas can be surveilled simultaneously), the time of observation (since transmission can be delayed if network connectivity is intermittent), and so on.

The edge platform 101 can transmit a detection data 135 over a network 140 to a central server platform 150. The detection data 135 can include a subset of the image data (which can be the subset used by the image recognition models 120), the classification output data 125 and other data added by the augmenter 130. Since the capacity of the network 140 can be limited, transmitting only the subset of the camera data used by the image recognition models 120 can improve the efficiency of the overall system by conserving network 140 bandwidth. In addition, when network 140 bandwidth is not available, the edge platform 101 can buffer detections detection data 135 to be sent when bandwidth is restored.

The central server platform 150 can aggregate detection data 135 received from the edge platform 101, and from other edge platforms 101, and make the data recordable, reportable, searchable, and alarmable. The central server platform 150 can also include analysis models 155, which can require more processing resources than are available at the edge platform 101, that operate on one or more pieces of detection data 135 received from edge platforms 101, and can further operate on data provided from other sources (e.g., human or satellite intelligence) to produce predictions related to the environment.

In this example 100, the central server platform 150 could be configured with a reference image of the suspicious subject 105B, and having received detection data 135 containing image data of the suspicious subject 105B, can produce an alert. Further, in this example 100, the edge platform 101 can produce detection data 135 containing an image of the distressed child 105A. Since the detection data 135 were produced by the same edge platform 101 and at approximately the same time, models 155 in the central server platform 150 can determine that an immediate law enforcement 170 response is appropriate, and dispatch a local law enforcement 170 agency to investigate.

In addition, the central server platform 150 can provide data, including detection data 135 received from deployed edge platforms 101, though an Application Programming Interface (API) that is accessible to authorized parties such as law enforcement agencies. The API, which can accept Structured Query Language (SQL) queries, enables such parties to make complex determinations about events that can be detected by one or more edge platforms 101.

In one example, a law enforcement agency might be investigating the relationship between a car and an airplane, both suspected of being owned by a person of interest. In this example, an edge platform 101 monitoring an airport might detect a tail number and a second edge platform 101 might detect a license plate number. The central server platform 150 can match the detected tail number and detected license plate to respective reference images to determine that both the reference tail number and reference license plate have been matched. A law enforcement agency can use the API provided by the central server platform 150 to learn that both matches occurred, in addition to the locations and times of the matches, and use that information to respond appropriately.

Once the central server platform 150 acknowledges receipt of a detection data 135 from the edge platform 101, the edge platform 101 can remove data to preserve security and privacy. For example, the edge platform 101 can remove the image data received from the camera 110, and instruct the image recognition models 120 to delete the retained data and/or state information.

In summary, this example 100 illustrates an overview of a secure edge platform 101. One or more cameras 110 on a rig 105 can capture images of an environment. Image classification models 120 in the secure edge platform 120 can detect events of interest, and transmit relevant data to a central server platform 150, which can provide urgent notifications as necessary to law enforcement 170 and to other authorized parties as appropriate.

Figure 2:
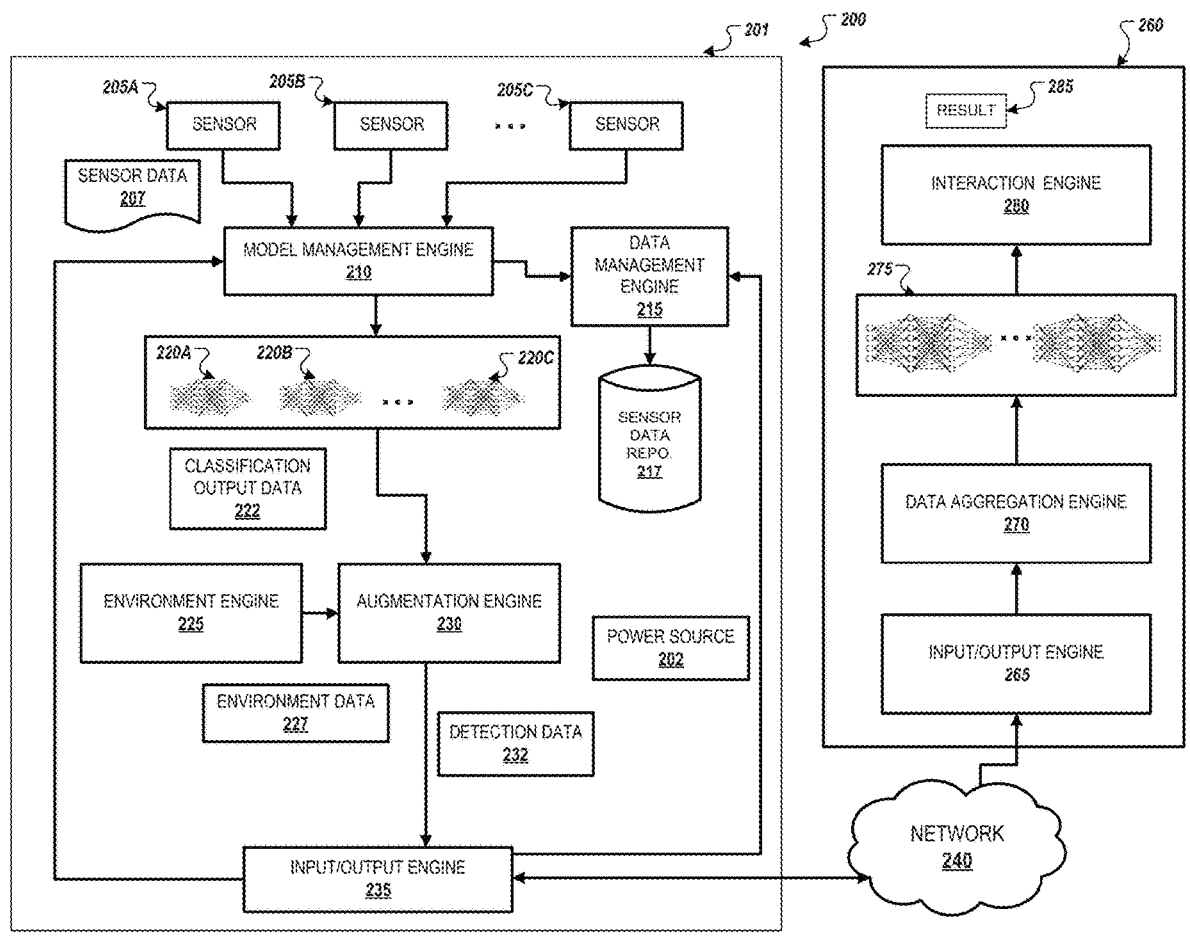
FIG. 2 shows an example of an environment for a secure edge platform.

FIG. 2 shows an example of an environment 200 for a secure edge platform. The environment can include a secure edge platform 201 (or "edge platform" for brevity), one or more networks 240 and a central server platform 250.

The edge platform 201 can include one or more sensors 205A, 205B, 205C (collectively referred to as sensors 205), a model management engine 210, a model execution engine 220, an environment engine 225, an augmentation engine 230, and an input/output (I/O) engine. The edge platform 201 can also include a power source 202, which provides power to the physical components of the edge platform 201 such as sensors and processors. The power source 202 can include a battery, allowing the edge platform 201 to be self-powered. The edge platform 201 can be coupled to one or more networks 240, as described further below.

Sensors 205 can be any devices that detect or measure physical properties in the vicinity of the edge platform 201. Examples of sensors 205 can include cameras (video cameras and/or still cameras), microphones, infrared sensors, LIDAR and RADAR, among other possibilities. Cameras can be capable of capturing high-definition camera data, which can be images and/or video. High definition camera data can include at least 720 vertical lines of data per image or video frames. The sensors 205 can be coupled to other components of the edge platform using various techniques. For example, the sensors 205 can be coupled to the edge platform using a wired technology such as peripheral component interconnect express (PCIe) or a wireless technology such as 802.11 or Bluetooth.

The model management engine 210 can manage machine learning models, such as sensor data classification models 220A, 220B, 220C (collectively referred to as sensor data classification models 220). The model management engine 210 can determine which sensor data classification models 220 are to be activated. The model management engine can accept messages from the I/O engine 235, and use the messages to determine which models should be active. The messages can be sent from administrators, the central server platform 260 or other sources. In addition, the model management engine 210 can use the output of models to determine which sensor data classification models 220 are to be activated. For example, if one model detects a license plate, a face detection model might be activated. The model management engine 210 can further include configuration information and/or rules, and use such information to determine which sensor data classification models 220 are to be activated. For example, a rule might indicate that one model is to be activated at a particular time or in particular lighting conditions. As described above, to conserve processing resources, the edge platform 201 need not have all sensor data classification models 220 active concurrently.

The model management engine 210 can accept sensor data 207 from sensors 205 and direct the sensor data 207 to the appropriate, active sensor data classification models 220. For example, if sensor data 207 is image data, the model management engine 210 can direct the sensor data 207 to the active sensor data classification model(s) 220 that are configured to processor image data. To conserve processing resources, the model management engine 210 can determine not to direct sensor data 207 to inactive sensor data classification models 220.

The sensor data classification models 220 can be any appropriate type of machine learning model that can accept sensor data 207 from sensors 205 and produce a predicted classification. For example, a sensor data classification model 220 can be an image data classification model, such as a convolutional neural network (CNN), that accepts image data from a camera sensor 205 and produces classification output data 222 that includes the predicted classification. Each sensor data classification model 220 can be configured to produce a particular type classification output data 222. For example, various sensor data classification models 220 can be configured to predict whether a particular type of object has been detected, and object types can include faces, license plates, tail numbers, and so on. Sensor data classification models 220 can also provide additional information about the sensor data and include that data in the classification output data 222. For example, an image data classification model can also generate predictions related to whether glasses are present, estimated age or race, mood of the subject, etc. In some implementations, the additional information about the sensor data can be produced by other machine learning models and included in the classification output data 222. The classification output data 222 can further include an indication of the sensor data 207, or a subset of the sensor data 207, used to produce the predicted classification.

The data management engine 215 can accept sensor data 207, store the data in a sensor data repository 217 and remove stored data from the sensor data repository 217. The sensor data 207 can be any type of digital representation of conditions sensed by a sensor 205. For example, sensor data 207 can be video data encoded as Moving Picture Expert Group-4 (MP4) data, still image data encoded as Tag Image File Format (TIFF) or RAW data, audio data encoded as Moving Picture Expert Group-3 (MP3) or Waveform Audio File Format (WAV) data, and so on. Sensor data 207 can include information about the sensor reading, such as the time at which the sensor data 207 were captured, the sensor 205 used to capture the sensor data 207, configuration information about the sensor 207 (e.g., a camera's ISO setting or focal length of the lens), sensor location (e.g., GPS coordinates), etc.

The sensor data repository 217 can be any appropriate storage system or device. For example, the sensor data repository 217 can be a database, such as relational database, file storage, or block storage. The sensor data repository can also be a video management system (VMS). While the sensor data repository 217 is illustrated as being within the edge platform 201, the sensor data repository 217 can be physically separate from, but coupled to, the edge platform 201.

The environment engine 225 can detect properties of the edge platform 201 and the environment around the edge platform 201, and provide environment data 227 to the augmentation engine 230. Properties can include the location of the edge platform 201 (e.g., as configured into the environment engine 225 or detected using a GPS device in the edge platform 201), an edge platform identifier, weather conditions (e.g., obtained using a wireless network from a weather service or detected using sensors such as a barometer included in the edge platform 201), lighting conditions (e.g., obtained using a lighting sensor on the edge platform 201 or from references images provided by a sensor 205), and so on. The environment engine 225 can include such information in environment data 227, and provide the environment data 227 to the augmentation engine 230.

The augmentation engine 230 can accept sensor data 207, classification output data 222 and environment data 227 and produce detection data 232. The detection data 232 can contain structured and unstructured data, and can be encoded in any suitable format, such as Extensible Markup Language (XML) or Javascript Object Notation (JSON). Further, the detection data 232 can be encrypted using either symmetric or asymmetric encryption. Example of symmetric encryption can include Advanced Encryption Standard (AES), Data Encryption Standard and Rivest Cipher 4 (RC4); examples of asymmetric encryption can include Elliptical Curve Cryptography (ECC), Rivest Shamir Adleman (RSA) and Diffie-Hellman. Encryption keys used to encrypt the detection data 232 can be configured into the edge platform 201.

The I/O engine 235 can transmit and receive data from a network 240, including to the central server platform 260. The network 240 can be a local area network (LAN), a wide area network (WAN), a cellular network, a coded orthogonal frequency-division multiplexing (COFDM) radio network, the Internet, other suitable networks, or any combination thereof. The I/O engine 235 can transmit and receive over the network using any suitable protocol such as the Transmission Control Protocol, the User Datagram Protocol (UDP), other Internet Protocol (IP) protocols, other suitable network protocols, or any combination thereof.

The central server platform 260 can accept detection data 232 from one or more edge platforms 201, and make the data recordable, reportable, searchable, and alarmable. The central server platform 260 can include an I/O engine 265, a data aggregation engine 270, one or more machine learning models 275 and an interaction engine 280.

The I/O engine 265 can transmit and receive data, including detection data 232, from a network 240. The I/O engine 265 can be functionally equivalent to I/O engine 235.

The data aggregation engine 270 can accept detection data 232 provided by an edge platform 201, store and aggregate the data, and make the data available for additional analysis and for user review. In some implementations, the data aggregation engine 270 can decrypt encrypted detection data 232 using one or more encryption keys provided to the data aggregate engine 270, e.g., by providing configuration information that includes the keys. The data aggregation engine 270 can further store received data in persistent data repositories such as file systems, block storage devices or databases.

The machine learning models 275 can be configured to perform analysis on the received detection data 232 either individually or in aggregate. For example, a machine learning model 275 can be configured to determine whether an image of a face included in a detection data 232 matches an image of a subject of interest. The machine learning models 232 can be any appropriate type of machine learning model, such as a convolutional neural network, a residual neural network, a support vector machine, among many other examples. The machine learning models 275 can provide predictions to the interaction engine 280.

The interaction engine 280 can provide results 285, which can include raw data (e.g., data received in detection data 232), composite data (e.g., data aggregated from multiple detection data 232, which can be combined with data from other sources), analysis data (e.g., predictions from machine learning models 275), or any combination thereof. The interaction engine 280 can provide results 285 using a variety of techniques. The interaction engine 280 can include an Application Programming Interface (API) that allows authorized users to programmatically access results 285. The interaction engine 280 can provide user interaction presentation data that can be rendered by a client device (e.g., desktop computer, laptop computer or mobile device) to display results 285. The interaction engine 280 can provide notifications to external parties such as law enforcement, enabling a rapid response when the central server platform 260 determines a response is warranted.

Figure 3:
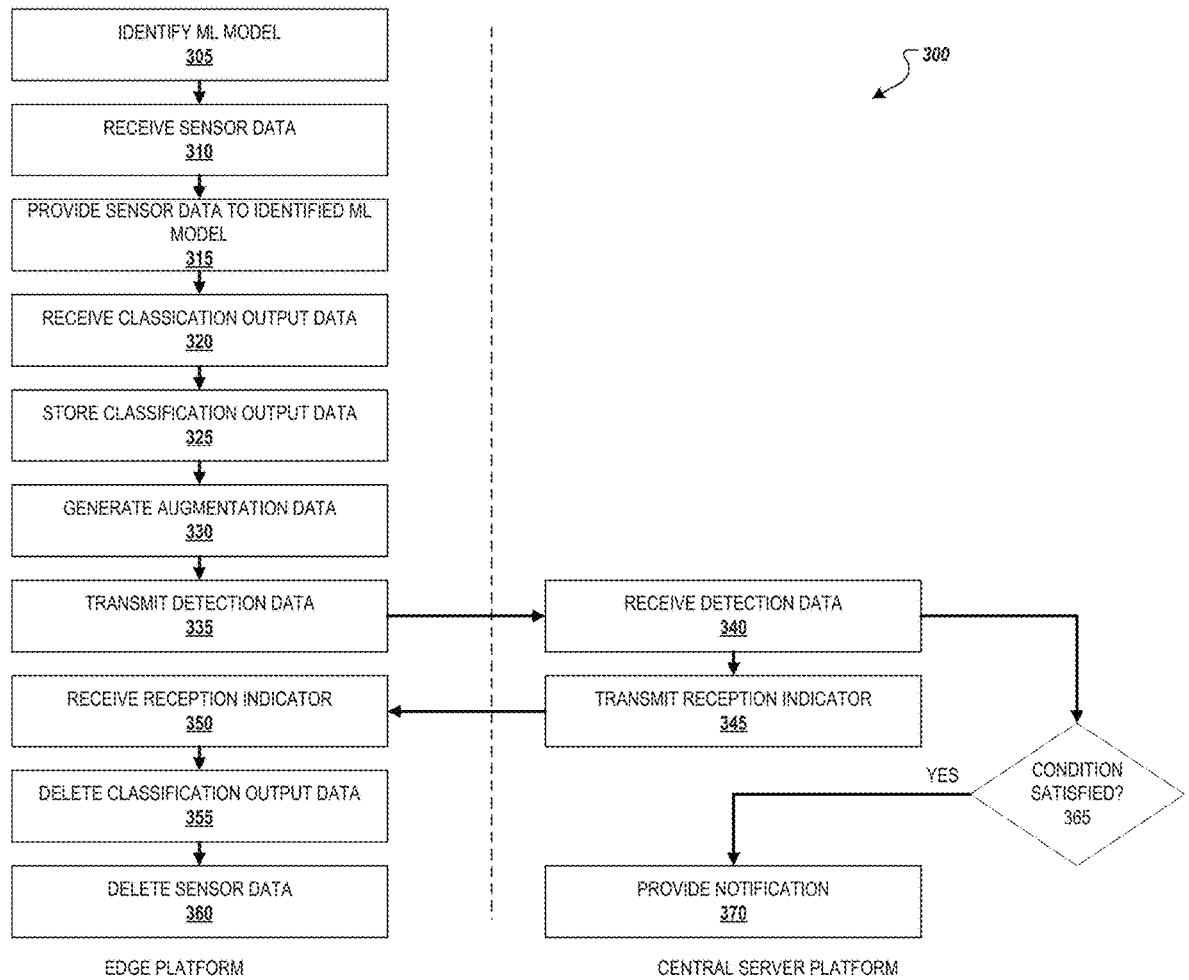
FIG. 3 is a flow diagram of an example process for operating a secure edge platform.

FIG. 3 is a flow diagram of an example process for operating a secure edge platform. For convenience, the process 300 will be described as being performed by a secure edge platform and a central server platform e.g., the secure edge platform 201 and central server platform 260 of FIG. 2, appropriately programmed to perform the process. Operations of the process 300 can also be implemented as instructions stored on one or more computer readable media which may be non-transitory, and execution of the instructions by one or more data processing apparatus can cause the one or more data processing apparatus to perform the operations of the process 300. One or more other components described herein can perform the operations of the process 300.

The edge platform can identify (305) one or more sensor data classification models ("models," for brevity), which can be image classification models. The models can be configured to generate classification output data based upon sensor data, which can be image data, that is generated by at least one sensor (e.g., a camera) and provided to the models included on the edge platform. To determine which model or models are active, the edge platform can identify the models using various techniques. For example, the edge platform can include configuration information that identifies one or more models. In another example, the edge platform can include an API that enables an authorized user to provide a list that includes the identified model. The edge platform can also include configuration information and an API such that the edge platform uses the configured information unless that information is modified by the API.

The edge platform can receive (310) sensor data, which can be image data, that was generated by the at least one sensor included on the edge platform. The sensor can transmit the sensor data over the coupling (e.g., PCIe) to the edge platform. The sensor data can be transmitted using in an appropriate protocol. For example, if the sensor data is video data, the edge platform can receive the data from a Real Time Streaming Protocol (RTSP) stream. If the sensor is a still camera, the sensor data can be images encoded in an appropriate image format, as described above, and transmitted to the edge platform from the sensor using a protocol appropriate for the coupling between the sensor and the edge platform.

In response to providing the particular sensor data to the one or more particular models, which can be active models, the edge platform can receive (320), particular classification output data from the one or more particular models. As described above, the models can be any appropriate machine learning model, such as a CNN, that is configured to accept sensor data as input and to produce a prediction that classifies the sensor data. The output data can include one or more predicted classifications of the sensor data. For example, a model can be configured to detect faces, and the output data can indicate whether the model predicts that a face was detected. In other example, the model can be configured to detect license plates, and the output data can indicate whether a license plate was detected. In some implementations, when a predicted detection occurs (e.g., the model determines that a face is present), the output data also includes the data on which the prediction was made (e.g., the image data that includes the face or a short video segment that includes the face).

The edge platform can store (325) classification output data using various data storage techniques. For example, the edge platform can store the classification output data on a file system or block storage device included in, or coupled to, the edge platform. In another example, the edge platform can storage video data in a video management system (VMS) that is include in, or coupled to, the edge platform.

In response to receiving the classification output data from one or more image classification models, the edge platform can generate (330) augmentation data associated with the particular image data. As described above, the augmentation data can include a broad range of relevant data such as the GPS coordinates of the edge platform and the orientation of the camera or other sensor type, among many other examples. The particular augmentation data generated can depend on the type of model that produced the classification, the particular model that produced the classification data, the contents of the classification data, and other factors. For example, if the model is a face detection model, the augmentation data can include the time the face was detected, the number of faces detected over some interval, an identifier of the sensor (e.g., camera) used to make the detection, the resolution of the sensor (e.g., number of megapixels of a camera), and so on. In another example, if the prediction score generated by the model exceeds a configured threshold (e.g., 90% confidence or 95% confidence), the augmentation data can include an indication of a high-likelihood recognition.

The edge platform can transmit (335) detection data to a central server platform, and the detection data can include (i) the particular classification output data and (ii) the augmentation data associated with the particular image data. The edge platform can transmit the detection data using any appropriate networking protocol. For example, the edge platform can transmit the detection using the Transmission Control Protocol (TCP). As described above, to produce the detection data, the edge platform can combine the classification output data and the augmentation data into a structured format such as XML or JSON, and the edge platform can encrypt the detection data using symmetric or asymmetric encryption.

The central server platform can receive (340) detection data using the protocol selected by the edge platform. For example, if the edge platform uses TCP, the central server platform can receive the detection data over TCP. Upon successful receipt of the detection data, the central server platform can transmit (345) a reception indicator to the edge platform indicating that the detection data was received. In some implementations, e.g., implementations that use TCP, the protocol itself will provide the reception indicator, and the central server platform need not provide any additional data. In other implementations, e.g., protocols such as User Datagram Protocol (UDP) that use "best effort" transmission, the central server platform transmits data that includes the reception indicator. In some implementations, the edge platform and the central server platform can use a two-phase commit protocol to ensure delivery of the detection data.

The edge platform can receive (350) the reception indicator at edge platform. As noted above, the reception indicator can be inherent in the protocol (e.g., TCP) or transmitted by the central server platform (e.g., as part of a two-phase commit protocol).

Upon receipt of the reception indicator, the edge platform can delete (355) classification output data. The edge platform can delete the classification output data using techniques appropriate for the storage system holding the classification output data. For example, if the classification output data is stored on a file system, the edge platform can issue a command to the file system to delete the data. In another example, if the classification output data is stored in a relational database, the edge platform can issue a Structured Query Language (SQL) instruction to delete the record(s) holding the classification output data.

As described above, deleting the classification output data provides multiple technical benefits. For example, the deletion helps preserve the privacy of members of the general public whose images can be captured incidentally. Further, the deletion provide security as bad actors cannot retrieve the classification output data once such data has been deleted. In addition, deleting the data reduces the amount storage resources that must be included in the edge platform.

The edge platform can delete (360) sensor data (which can be image data). In some implementations, the edge platform deletes the data directly by removing it from storage (e.g., using a file system or SQL operation). In some implementations, the edge platform can instruct some or all of the models to delete any cached copies of the sensor data retained by the model. Such deletions provide similar benefits to those described above, including privacy and resource reduction.

In some implementations, the central server platform can determine (365) whether one or more conditions are satisfied by the detection data. The central server platform can include one or more models, which can be machine learning models, that are configured to determine whether sensor data included in the detection data satisfies a condition. For example, the central server platform can include a machine learning model, such as a CNN, that is configured to determine whether image data in the detection data includes a particular reference image, such as face, license plate number or tail number. The machine learning model can produce a score that indicates whether the sensor data is predicted to match the reference image. If a match is predicted, the central server platform can perform operation 370.

Performing the matching against reference images at the central server platform instead of on the edge platform provides various technical advantages. For example, the central server platform is large and fixed, and therefore cannot be moved or stolen, thus providing additional security for the reference images, which can indicate persons of interest. Since the list of persons of interest can be highly confidential, and can include private data, storing such data in a secure location is a technical advantage. In addition, in some cases, there can be numerous subjects of interest, and running the models to detect their presence can require a level of compute resource that is available at the central server platform, but not on the edge platform.

In response to determining that the condition is satisfied, the central server platform can provide (370) one or more notifications. For example, the central server platform can maintain a list of law enforcement agencies that have registered an interest in a reference image, and the central server platform can provide a notification to those registered law enforcement agencies when a match to the reference image is detected. The notification can be transmitted using various techniques, such as providing a TCP message, transmitting a text message, or providing a recorded telephone message.

Figure 4:
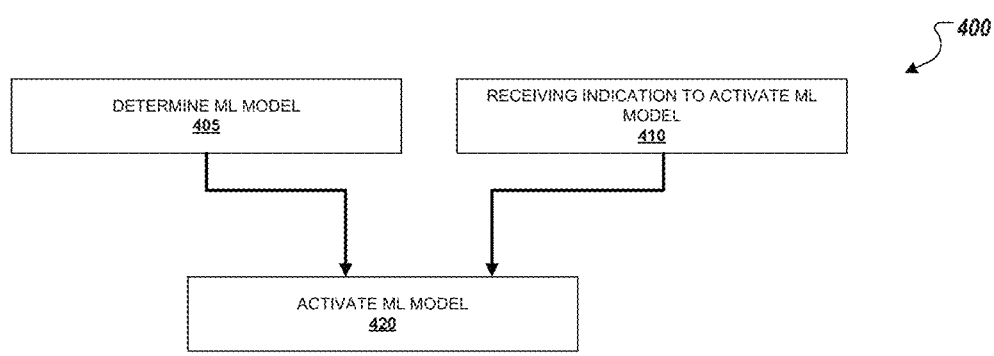
FIG. 4 is a flow diagram of an example process for activating a sensor data classification model.

FIG. 4 is a flow diagram of an example process for activating a sensor data classification model. For convenience, the process 400 will be described as being performed by a secure edge platform, e.g., the secure edge platform 201 of FIG. 2, appropriately programmed to perform the process. Operations of the process 400 can also be implemented as instructions stored on one or more computer readable media which may be non-transitory, and execution of the instructions by one or more data processing apparatus can cause the one or more data processing apparatus to perform the operations of the process 400. One or more other components described herein can perform the operations of the process 400.

In some implementations, the edge platform can determine (405) a sensor data classification model to activate using various techniques. In one example, if the edge platform receives sensor data (e.g., acoustic data) that cannot be processed by an active sensor data classification model, the edge platform can determine a sensor data classification model (e.g., a machine learning model configured to process acoustic data) that is configured to process the sensor data. In another example, if the edge platform is receiving sensor data at a rate at which the data cannot be processed by the active sensor data classification models, the edge platform can determine a new sensor data classification model to activate, and/or determine a new instance of a sensor data classification model that is already active.

In some implementations, the edge platform can receive (410) an indication to activate a sensor data classification model. As described above, the edge platform can include an API that enables a user (which can be an authorized person or a computer program) to specify a sensor data classification model, which can be an image data classification model, that is to be activated. The edge platform API can include a method that provides a list of classification models that are on the edge platform and are not currently active to a caller of the API. The caller can then select one or more classification models from the list, and use the API to provide an identifier for the sensor data classification model to activate.

Similarly, the API can also include a method that provides a list of classification models that are on the edge platform and are currently active to a caller of the API. The caller can then select one or more classification models from the list, and use the API to provide an identifier for the sensor data classification model to deactivate.

In response to receiving or determining, the edge platform can activate (420) a sensor data classification model. The edge platform can activate a sensor data classification model by adding it to a registry of active models, and each entry in the registry can include a sensor data classification model identifier and a type of data processed by the sensor data classification model. When the edge platform receives sensor data, the edge platform can determine the type of sensor data (e.g., still image, HD video, low-definition video, acoustic, infrared, etc.), determine from the registry which sensor data classification model(s) are active and configured to process the type of data, and provide the sensor data to the one or more determined sensor data classification models.

In some implementations, the edge platform can determine a sensor data classification model to deactivate. To determine whether to deactivate a model, the edge platform can monitor operational characteristics of the edge platform such as the average and/or peak percentage of processing resources consumed, remaining battery life (if the edge platform does not have an external power source), temperature, average and peak memory consumed, etc. If one or more operational characteristics satisfy a threshold, which can be specific to a particular operational characteristic (e.g., the temperature can have one threshold and the battery life can have a separate threshold), the edge platform can determine a sensor data classification model to deactivate.

Once the edge platform has determined that a model should be deactivated, the edge platforms can use various techniques for selecting the sensor data classification model to deactivate. For example, the edge platform can deactivate the sensor data classification model that has been least recently used. In another example, the edge platform can deactivate the sensor data classification model that has been the least used over a period of time (e.g., 1 minute, 5 minutes, 30 minutes, etc.). Other selection techniques can also be used.

The edge platform can deactivate the selected models by removing the corresponding entry from the registry of active sensor data classification models. In addition, the edge platform can continue to monitor operational characteristics, and if another threshold is satisfied, the edge platform can repeat the process of determining sensor data classification models to deactivate and deactivating them.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors (e.g., central processing units, graphic processing units, among other processor type) or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
identifying, by an edge platform that comprises at least one camera, one or more particular image classification models from among multiple image classification models that are associated with the edge platform, each image classification model being configured to generate classification output data based upon processing image data that is generated by the at least one camera included on the edge platform;
receiving, by the edge platform, particular image data that was generated by the at least one camera included on the edge platform;
providing, by the edge platform, the particular image data to the one or more particular image classification models;
in response to providing the particular image data to the one or more particular image classification models, receiving, by the edge platform, particular classification output data from the one or more particular image classification models; and
in response to receiving the particular classification output data from the one or more particular image classification models, generating, by the edge platform, augmentation data associated with the particular image data, combining the augmentation data and the particular classification output data according to a structured format to generate detection data, then transmitting, by the edge platform, the detection data to a central server platform.

2. The computer-implemented method of claim 1, further comprising:
before generating the augmentation data, storing, by the edge platform, the particular classification output data on a local storage medium that is associated with the edge platform;
after transmitting the detection data to the central server platform, receiving, by the edge platform, an indication that the detection data has been received by the central server platform, then, and in response to receiving the indication that the detection data has been received by the central server platform, deleting the particular classification output data from the local storage medium that is associated with the edge platform.

3. The computer-implemented method of claim 2, further comprising:
after receiving the indication that the detection data has been received by the central server platform, and in response to receiving the indication that the detection data has been received by the central server platform, providing by the edge platform and to one or more particular image classification models, an instruction to delete the particular image data and the particular classification output data.

4. The computer-implemented method of claim 1 wherein the at least one camera is a high-definition video camera.

5. The computer-implemented method of claim 1 wherein the detection data further includes at least a subset of the particular image data.

6. The computer-implemented method of claim 5, further comprising:
in response to receiving, by the central server platform, the detection data:
determining that the detection data satisfies a matching condition; and
providing a notification to a responding party.

7. The computer-implemented method of claim 6, wherein the detection data includes a detected face, and determining that the detection data satisfies a matching condition comprises matching the detected face against a reference face.

8. The computer-implemented method of claim 6, wherein the detection data includes a detected license plate number, and determining that the detection data satisfies a matching condition comprises matching the detected license plate number against a reference license plate number.

9. The computer-implemented method of claim 6, wherein the detection data includes a detected tail number, and determining that the detection data satisfies a matching condition comprises matching the detected tail number against a reference tail number.

10. The computer-implemented method of claim 6 wherein the responding party is one or more law enforcement agents.

11. The computer-implemented method of claim 1, further comprising:
receiving, by the edge platform, an indication to activate a second image classification model from among multiple image classification models that is not one or more particular image classification models; and
activating, by the edge platform, the second image classification model.

12. The computer-implemented method of claim 1, further comprising:
 determining, by the edge platform, that a second image classification model from among multiple image classification models that is not one or more particular image classification models should be activated; and
 activating the second image classification model.

13. The computer-implemented method of claim 1 wherein the particular classification output data from the one or more particular image classification models indicates one or more of detecting a face, detecting a license plate number or detecting a tail number.

14. A system comprising one or more computers and one or more storage devices storing instructions that when executed by the one or more computers cause the one or more computers to perform operations comprising:
 identifying, by an edge platform that comprises at least one camera, one or more particular image classification models from among multiple image classification models that are associated with the edge platform, each image classification model being configured to generate classification output data based upon processing image data that is generated by the at least one camera included on the edge platform;
 receiving, by the edge platform, particular image data that was generated by the at least one camera included on the edge platform;
 providing, by the edge platform, the particular image data to the one or more particular image classification models;
 in response to providing the particular image data to the one or more particular image classification models, receiving, by the edge platform, particular classification output data from the one or more particular image classification models; and
 in response to receiving the particular classification output data from the one or more particular image classification models, generating, by the edge platform, augmentation data associated with the particular image data, combining the augmentation data and the particular classification output data according to a structured format to generate detection data, then transmitting, by the edge platform, the detection data to a central server platform.

15. The system of claim 14, the operations further comprising:
 before generating the augmentation data, storing, by the edge platform, the particular classification output data on a local storage medium that is associated with the edge platform;
 after transmitting the detection data to the central server platform, receiving, by the edge platform, an indication that the detection data has been received by the central server platform, then, and in response to receiving the indication that the detection data has been received by the central server platform, deleting the particular classification output data from the local storage medium that is associated with the edge platform.

16. The computer-implemented method of claim 15, the operations further comprising:
 after receiving the indication that the detection data has been received by the central server platform, and in response to receiving the indication that the detection data has been received by the central server platform, providing by the edge platform and to one or more particular image classification models, an instruction to delete the particular image data and the particular classification output data.

17. The system of claim 14 wherein the at least one camera is a high-definition video camera.

18. The system of claim 14 wherein the detection data further includes at least a subset of the particular image data.

19. The system of claim 14, the operations further comprising:
 receiving, by the edge platform, an indication to activate a second image classification model from among multiple image classification models that is not one or more particular image classification models; and
 activating, by the edge platform, the second image classification model.

20. One or more non-transitory computer-readable storage media storing instructions that when executed by one or more computers cause the one or more computers to perform operations comprising:
 identifying, by an edge platform that comprises at least one camera, one or more particular image classification models from among multiple image classification models that are associated with the edge platform, each image classification model being configured to generate classification output data based upon processing image data that is generated by the at least one camera included on the edge platform;
 receiving, by the edge platform, particular image data that was generated by the at least one camera included on the edge platform;
 providing, by the edge platform, the particular image data to the one or more particular image classification models;
 in response to providing the particular image data to the one or more particular image classification models, receiving, by the edge platform, particular classification output data from the one or more particular image classification models; and
 in response to receiving the particular classification output data from the one or more particular image classification models, generating, by the edge platform, augmentation data associated with the particular image data, combining the augmentation data and the particular classification output data according to a structured format to generate detection data, then transmitting, by the edge platform, the detection data to a central server platform.

* * * * *